(12) United States Patent
Speckhart et al.

(10) Patent No.: US 7,249,649 B2
(45) Date of Patent: Jul. 31, 2007

(54) OCCUPANT SENSOR FOR A VEHICLE RESTRAINT SYSTEM

(75) Inventors: Frank H. Speckhart, 3411 Kingston Pike, Knoxville, TN (US) 37919; Travis M. Kimmins, Newport News, VA (US)

(73) Assignee: Frank H. Speckhart, Knoxville, TN (US)

( * ) Notice: Subject to any disclaimer, the term of this patent is extended or adjusted under 35 U.S.C. 154(b) by 362 days.

(21) Appl. No.: 10/772,118

(22) Filed: Feb. 4, 2004

(65) Prior Publication Data

US 2005/0167959 A1 Aug. 4, 2005

(51) Int. Cl.
*B60R 21/01* (2006.01)
*B60R 21/32* (2006.01)

(52) U.S. Cl. .................. 180/273; 280/735; 177/136; 338/31; 338/47; 338/50; 338/118; 338/160

(58) Field of Classification Search ................ 180/273; 280/735, 734; 701/45; 73/862.474, 862.338, 73/862.473, 862.627; 177/136, 210 R, 211, 177/144; 338/28, 29, 31, 47, 50, 117, 118, 338/137, 143, 149, 160, 162, 168, 169–171, 338/202

See application file for complete search history.

(56) References Cited

U.S. PATENT DOCUMENTS

| 5,232,243 | A | 8/1993 | Blackburn et al. |
| 5,474,327 | A | 12/1995 | Schousek |
| 5,573,269 | A | 11/1996 | Gentry et al. |
| 5,624,132 | A | 4/1997 | Blackburn et al. |
| 6,015,163 | A | 1/2000 | Langford et al. |
| 6,092,838 | A | 7/2000 | Walker |
| 6,161,439 | A | 12/2000 | Stanley |
| 6,313,730 | B1 * | 11/2001 | Ohara et al. ................ 338/176 |
| 6,348,663 | B1 * | 2/2002 | Schoos et al. ............... 177/144 |
| 6,422,595 | B1 | 7/2002 | Breed et al. |
| 6,513,830 | B2 | 2/2003 | Breed et al. |
| 6,849,808 | B2 * | 2/2005 | Enomoto et al. ............ 177/144 |

\* cited by examiner

*Primary Examiner*—Ruth Ilan
(74) *Attorney, Agent, or Firm*—Pitts & Brittian, PC (57) ABSTRACT

An apparatus for sensing an occupant in a vehicle seat for a vehicle occupant restraint system is provided. The apparatus uses sensors to measure seat deflection to determine the presence, weight, and seated location of the occupant. The sensors are connected to a processor which controls air bag deployment. In one embodiment, the apparatus uses sensors that transfer linear movement to the processor. In another embodiment, the apparatus uses sensors that transfer linear to rotational movement of seat deflection to the processor.

28 Claims, 6 Drawing Sheets

OCCUPANT SENSOR FOR A VEHICLE RESTRAINT SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to an apparatus to sense seated occupants for a vehicle occupant restraint system. More particularly, this invention pertains to the use of sensors to measure seat deflection, and the use of electrical signals to determine if the person's weight and seating position are such that an airbag should be deployed.

2. Description of the Related Art

Air bags are important safety devices in modern motor vehicles. There have been, however, injuries associated with the actuation of air bags located in front of and to the side of the passenger seats of vehicles. The occupant of a passenger seat may be injured by the air bag if the occupant is a baby or child in a child seat, a small child, or a child or adult seated too close to the air bag on the front portion of the seat. Attempts to prevent actuation of air bags under unfavorable circumstances are known in the art.

U.S. Pat. No. 6,015,163, titled "System for Measuring Parameters Related to Automobile Seat," issued to Langford et al. on Jan. 18, 2000, discloses a system that determines whether an air bag should be deployed in the case of an automobile crash. The system uses flexible potentiometers placed in an X-Y grid to determine the weight and position of a person. Position and weight are determined by monitoring a group of flexible potentiometers, each positioned between two turns of a coil spring 74 in or under a seat cushion or seat surface. Langford also discloses a flexible potentiometer attached to the main surface of a leaf spring 100. As a load or force is applied to the spring, the flexible potentiometers produce a resistance change.

U.S. Pat. No. 5,474,327, titled "Vehicle Occupant Restraint with Seat Pressure Sensor," issued to Schousek on Dec. 12, 1995, discloses a system that disables actuation of an air bag when an occupant weight that is less than a minimum weight and/or a weight center is forward of a reference line. The seat occupant sensing system includes a voltage divider, having a fixed resistor 26 in series with a pressure sensor or variable resistor 28. Each sensor is mounted between polymer film sheets and includes a pair of conductive electrodes separated by a carbon layer such that the resistance between the electrodes changes as pressure changes. The type of variable resistor is not discussed.

U.S. Pat. No. 6,161,439, titled "Seat Belt Tension Prediction," issued to Stanley on Dec. 19, 2000, discloses a seat belt tension prediction system which includes an accelerometer and a seat weight sensor. The seat weight sensor includes a plurality of force sensitive resistive elements 42 which provide a variable electrical resistance responsive to the amount of force acting on the elements 42. The type of force sensitive resistive element is not disclosed.

U.S. Pat. No. 6,092,838, titled "System and Method for Determining the Weight of a Person in a Seat in a Vehicle," issued to Walker on Jul. 25, 2000, discloses the use of load sensor beams to detect a person seated in a vehicle seat. Strain gauges 104a-d, which are variable resistance strain gauges, are used to quantify the weight of the person sitting on the seat.

U.S. Pat. No. 6,513,830, titled "Method and Appartus for Disabling an Airbag System in a Vehicle," issued to Breed et al. on Feb. 4, 2003 discloses a method and apparatus for determining the position of a seat using a potentiometer 601. The potentiometer 601 is positioned along the seat track 602, and a sliding brush assembly 603 is used to determine the fore and aft location of the seat 610.

U.S. Pat. No. 5,232,243, titled "Occupant Sensing Apparatus," issued to Blackburn et al. on Aug. 3, 1993, discloses an occupant sensing apparatus having an occupant sensor 60 located in the bottom cushion 42 of an automobile seat 34. The occupant sensor 60 is a multi-layer piezoelectric film sensor 110.

BRIEF SUMMARY OF THE INVENTION

According to one embodiment of the present invention, an apparatus for determining the presence, weight, and seated location of an occupant in a vehicle seat is provided. The apparatus uses sensors to measure seat deflection to determine whether an airbag should be deployed in the case of an automobile crash. In one embodiment, the apparatus includes sensors that transfer linear movement to a processor which controls air bag deployment. In another embodiment, the apparatus includes sensors with rotary potentiometers to transfer movement to a processor which controls air bag deployment.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An occupant sensing apparatus 10 for sensing the presence, weight, and position of a person or object in a vehicle seat is disclosed. The apparatus uses sensors 202 to determine whether an airbag should be deployed in the case of an automobile crash.

The term "person" refers to a human driver or passenger in a vehicle. The term "object" refers to non-human items located on a vehicle seat. In one embodiment, a baby seat is an object. The term "occupant" refers to a person and/or an object that occupies or is located on a vehicle seat. The term vehicle or automobile is intended to include passenger cars, vans, trucks, airplanes, and other vehicles that employ air bags or use occupant restraint systems.

In one embodiment, presence, weight, and position of an occupant are determined. In other embodiments, only one or some of these indicators are determined. The term 'presence' simply indicates whether an occupant is sitting in a seat. In one embodiment, if presence is not detected, the air bag system will disable. The term 'position' simply indicates seating location or where an occupant is putting weight on the seat. The term 'weight' is loosely used in the invention to refer to the heaviness or lightness of an occupant. The apparatus does not indicate an actual measurement of the occupant's weight in pounds or kilograms. Rather, in one embodiment, weight is understood as the force that the occupant exerts normal to the seat surface. In another embodiment, weight is the pressing force that the occupant exerts. Deflection of the seat caused by the occupant in a seat is a measurement of weight. For example, a light person around 50 pounds will create less downward deflection than a heavier person that weighs around 200 lbs. It is not necessary that the weight be accurately measured over a broad range. The accuracy of measuring weight is typically important only near a threshold point.

Figure 1:
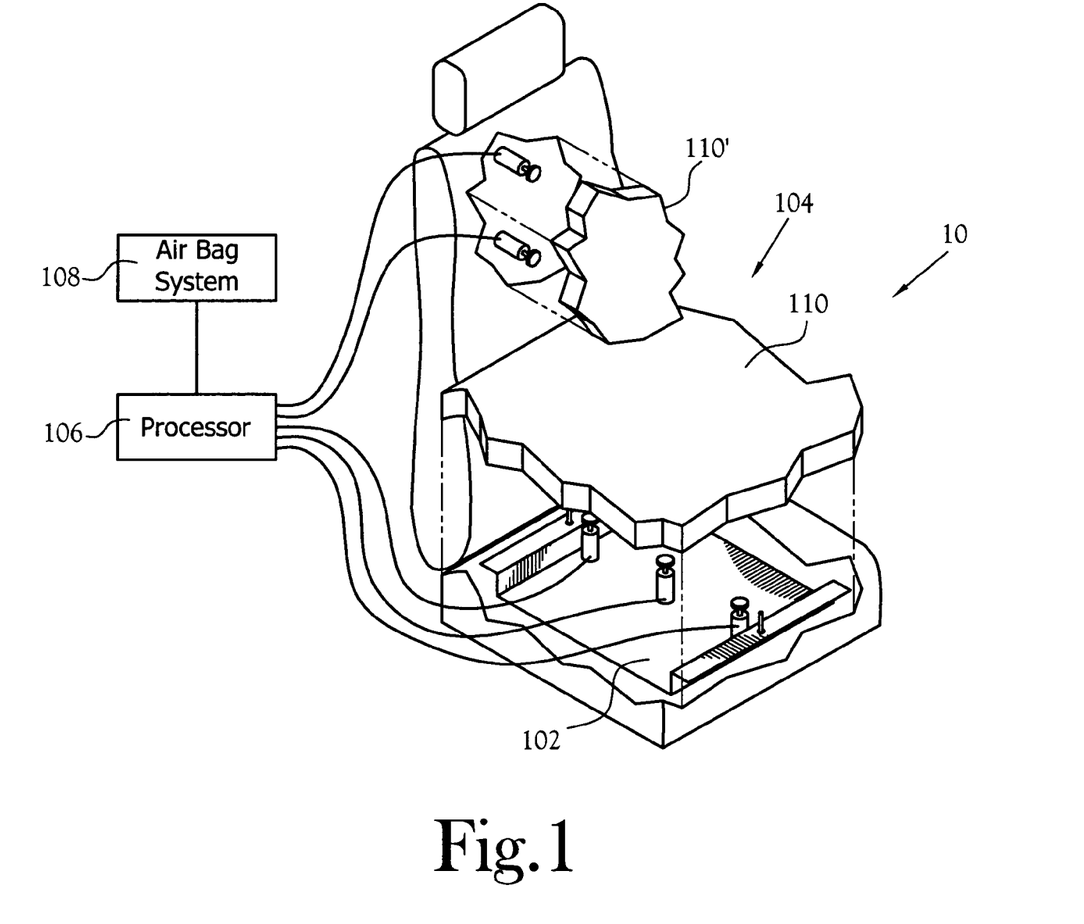
FIG. 1 is a perspective view of an occupant sensing apparatus fixed to a vehicle seat and connected to a processor that controls an air bag system.

FIG. 1 illustrates one embodiment of the apparatus 10 in which a sensor assembly 102 affixed to or placed under a vehicle seat 104. The sensor assembly 102 is connected to a processor 106, and the processor 106 controls deployment of an air bag system 108. When a person sits on the vehicle seat 104, the foam or deflection material 110, 110' on the sitting portion of the seat deflects varying amounts at different locations, which permits the sensing apparatus 10 to determine the presence, position, and/or weight of the person. This information is transmitted to the processor 106 which determines whether to deploy the air bag system 108 in the case of an automobile crash. In one embodiment, the sitting portion of the seat 104 is that portion illustrated in FIG. 1 as the deflection material 110. In another embodiment, the sitting portion of the seat 104 includes a seat back, or back of the seat against which the occupant leans. In still another embodiment, the sitting portion of the seat 104 includes a head rest.

In one embodiment, the vehicle seat 104 is the front passenger seat; however, in other embodiments, the vehicle seat 104 is any seat in the vehicle that accommodates an occupant restraint system. Further, in one embodiment, the vehicle seat 104 includes a bottom cushion 110 where a person sits and a back cushion 110' against which the person leans against. However, in other embodiments, the vehicle seat 104 includes the other parts of the seat where deflection can be measured, such as the head rest.

Those skilled in the art will recognize that the deflection material 110, 110' is any material or spring suspension that deflects when a force is applied to the material. This includes the standard cushion or foam that already exists in most vehicles. The invention does not require that the deflection be directly proportional to the force applied but requires only that a deflection occurs when a force is applied to the deflection material 110, 110'. The sensor assembly 102 is placed under and/or behind the deflection material 110, 110'. Those skilled in the art will recognize that the occupant sensing apparatus is affixed under the seat either to the bottom of the seat, to the floor board of the vehicle, or to the structural supports underneath or in the seat without departing from the spirit and scope of the present invention.

As used herein, the processor 106 should be broadly construed to mean any computer or component thereof that executes software. The processor 106 includes a memory medium that stores software, a processing unit that executes the software, and input/output (I/O) units for communicating with external devices. Those skilled in the art will recognize that the memory medium associated with the processor 106 can be either internal or external to the processing unit of the processor without departing from the scope and spirit of the present invention.

In one embodiment the processor 106 is a general purpose computer, in another embodiment, it is a specialized device for implementing the functions of the invention. Those skilled in the art will recognize that the processor 106 includes an input component, an output component, a storage component, and a processing component. The input component receives input from external devices, such as the sensors 202. The output component sends output to external devices, such as the air bag system 108. The storage component stores data and program code. In one embodiment, the storage component includes random access memory. In another embodiment, the storage component includes non-volatile memory, such as floppy disks, hard disks, and writeable optical disks. The processing component executes the instructions included in the software and routines.

Those skilled in the art will recognize that the air bag system 108 is any occupant restraint system and can be used without departing from the spirit and scope of the present invention. In one embodiment, variable air bags are used. Variable air bags are air bags that deploy with a varying amount of force or velocity depending on the presence of different sized and shaped objects in a vehicle seat. In another embodiment, the air bag system 108 is a standard non-variable air bag or one which is pre-existing in the vehicle.

In one embodiment, the input from the processor 106 to the air bag system 108 functions to disable and prevent actuation of the air bag system 108 if the input is below a threshold amount, or alternatively, depending on the design of the apparatus 10, above a threshold amount. In another embodiment, in order to prevent the air bag system 108 from injuring a person above or below the threshold weight in the vehicle seat 104, the air bag system 108 is disabled when the detected weight of the person in the vehicle seat 104 is below a lower weight limit or above an upper weight limit.

In one embodiment which involves a baby or child in a child seat, the detected weight is the weight of the baby or child seated in the child seat, plus the weight of the child seat. Therefore, when there is a child seat on the vehicle seat, the weight of the person seated in the vehicle seat 104 is defined to be the weight of the baby or child seated in the child seat, plus the weight of the child seat. In one embodiment, to prevent the air bag system 108 from injuring babies and small children seated in child seats, the occupant sensing apparatus 10 detects the presence of the child seat and disables the air bag system 108. In another embodiment, the air bag 108 is disabled when the detected weight of the child in the vehicle seat 104 or the child plus the weight of the child seat are below a lower weight limit.

One embodiment of the invention disables air bag actuation when the weight of the person on the vehicle seat 104 is above an upper weight limit. This is accomplished by the sensor assembly 102 measuring an upper threshold weight limit. The processor controls the air bag system 108 when the weight is below the lower weight limit or above the upper weight limit. Deployment of the air bag system 108 is disabled above the upper weight limit to prevent the air bag system 108 from injuring very large adults that, due to their size, would be located very close to the air bag system 108. The upper weight limit is a very large amount of weight, for example about three hundred (300) pounds. One embodiment reduces the force or the velocity of the air bag when the detected weight is above or below threshold values. Another embodiment disables or reduces the force or the velocity of the air bag when the detected seating position of the person is in a location that could cause injury to the person.

Figure 2A:
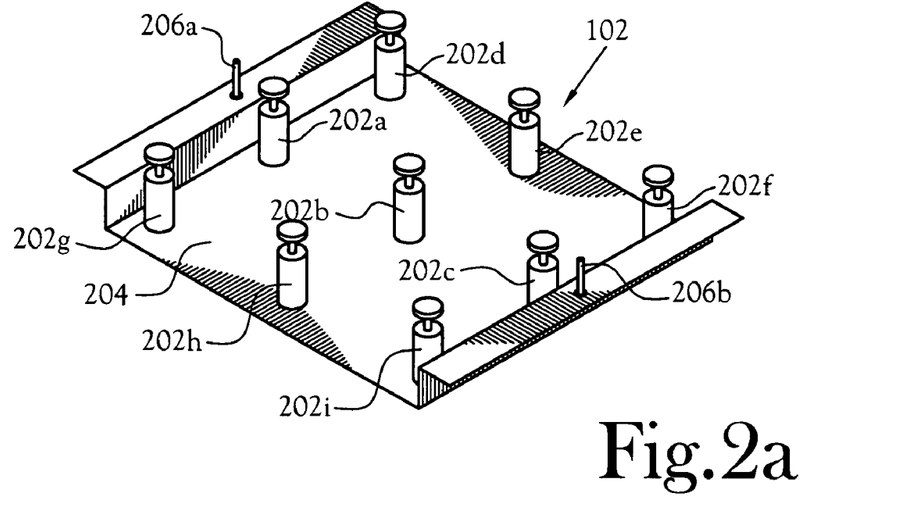
FIG. 2a is a perspective view of one embodiment of an occupant sensing apparatus.

FIG. 2a illustrates one embodiment of the sensor assembly 102. Nine sensors 202a-i are mounted as an assembly on a frame 204. The frame 204 is affixed to a vehicle seat using two fasteners 206a&b on opposite ends of the frame 204 so that the tops of the sensors 202a-i are biased upward and press lightly against the inside surface of the foam or deflection material 110, 110'. In other embodiments, the tops of the sensors 202a-i are attached, either mechanically or chemically, to the inside surface of the foam or deflection material 110, 110'. Such attachment can by clips, fasteners, adhesive, or other attachment means securing the movable portion of the sensors 202 to the deflection material 110, 110'.

Figure 2B:
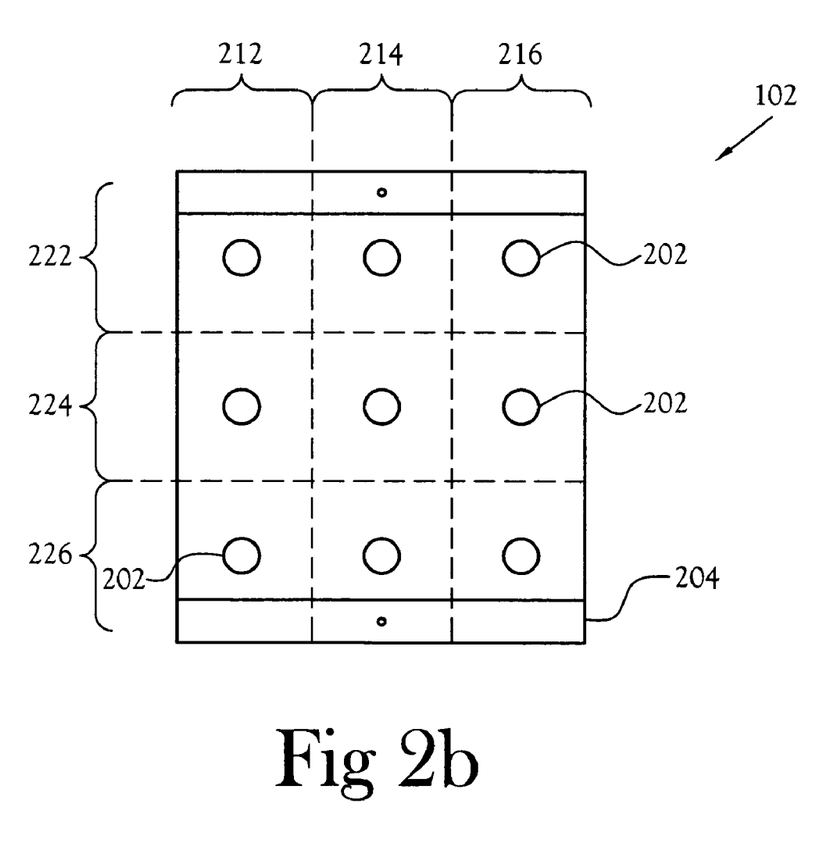
FIG. 2b is a plan view of the occupant sensing apparatus of FIG. 2a showing nine zones.

FIG. 2b illustrates one embodiment in which the sensors 202a-i are positioned in a grid of three columns of three rows. The seat 110 has nine zones, or areas, in which the occupant is detected. The seat 110 is divided front to back into thirds 222, 224, 226 and again from side to side into thirds 212, 214, 216, thereby forming nine zones. Each sensor 202 is positioned in a corresponding zone, e.g., sensor 202g is located in a corner zone 212-222. The presence, position, and weight of an occupant is determined by the amount of deflection of each sensor 202 in each zone 212-222 to 216-226. The grid of zones 212-222 to 216-226 allows the determination of the occupant's front-to-back and side-to-side position on the seat 104.

In other embodiments, the number of sensors 202 mounted to the frame 204 or used in the sensor assembly 102 includes more or less than nine sensors 202. Those skilled in the art will recognize that the number and location of the sensors 202 mounted on the frame can vary without departing from the spirit and scope of the present invention. In one embodiment, only one sensor 202 is used in the middle of the vehicle seat 104 for detection of both presence and weight of an occupant. If detection of a child safety seat is required, one embodiment includes sensors 202 positioned to detect the presence of a child safety seat and a person. With increasing numbers of sensors 202, the detection of the person or object becomes more accurate.

Those skilled in the art will recognize that the frame 204 is any plastic molded, metal, or material able to mount the assembly of sensors 202. In one embodiment, the floor board under the vehicle seat 104 is used as the frame for the sensors 202. In another embodiment, the sensors 202 are held stationary with respect to the seat 104 and the movable portion of each sensor 202 is attached to the frame 204 or vehicle.

The sensors 202 are mounted using any means to stabilize the sensors to the frame. Those skilled in the art will recognize that this includes means such as soldering, use of adhesives, or frames designed or altered to stabilize the sensors without departing from the spirit and scope of the present invention.

In one embodiment, the frame 204 is attached to the vehicle seat 104 or affixed under the vehicle seat 104 to stabilize the sensor assembly 102. In another embodiment, the sensor assembly 102 is positioned in any part of the vehicle seat. This includes the head rest, the back support, the vehicle seat cushion and any other location that requires occupant detection. By placing the sensor assembly 102 in various or numerous places in the vehicle seat 104, detection of a person or object's position becomes more easily detected. Further, in one embodiment where a sensor assembly 102 is placed in the back support of the vehicle seat 104, the recline of the vehicle seat can be determined. When a person is reclined in a vehicle seat 104, the person may be injured if an air bag is actuated in the case of an automobile crash. The recline of a vehicle seat 104, therefore, is another factor that commonly is necessary when deciding if an air bag system 108 should be actuated.

In one embodiment, the assembly sensor 102 does not require fasteners 206 because the frame or sensors 202 are stabilized by simply positioning them in or under the vehicle seat 104. In embodiments that require fastening to the vehicle seat 104, floor board, or other structural support in the vehicle, those skilled in the art will recognize that fasteners 206 can be any attachment device that attaches the frame 204 to the vehicle seat 104, floor board, or other structural support in the vehicle such that the top of the sensors 202 press lightly against the bottom of the foam or deflection material 110 on the vehicle seat 104. Further, in various embodiments, the position of the fasteners 206 and the layout or design of the frame 204 varies according to the particular vehicle seat 104 or location within the vehicle seat 104 that requires the sensor assembly 102.

The embodiment illustrated in FIGS. 1, 2a, and 2b uses custom designed sensors 202 with wiper arm potentiometers. Potentiometers are transducers that change electrical resistance from a linear or rotational motion. Potentiometers are used in a wide variety of devices and the technology is mature. There are many existing types of potentiometers including carbon film, wire wound, and cermet (ceramic-metal). Potentiometers are useful because their life, precision, and accuracy are predictable and they are relatively unaffected by changes in environmental factors such as temperature and humidity. Further, potentiometers use little energy and are relatively unaffected by outside influences such as electromagnetic radiation.

Figure 3:
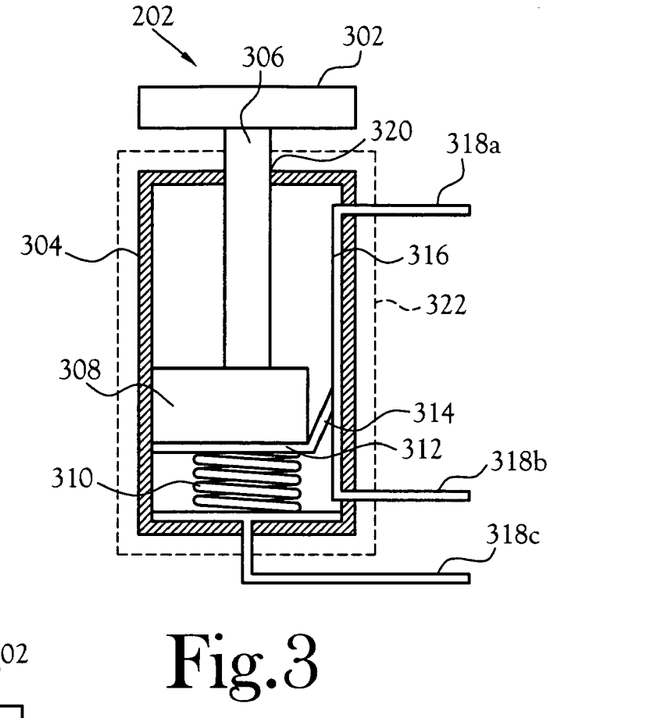
FIG. 3 is a cross-sectional view of one embodiment of a sensor.

FIG. 3 illustrates one embodiment of a sensor 202. A moveable member, such as an actuator 302, moves in a vertical direction due to the displacement of the seat material 100 caused by a person sitting in a vehicle seat 104. As the actuator 302 displaces, a connecting member, such as an actuator shaft 306, connected to the actuator 302, operates a potentiometer 322. A wiper arm 314, which moves with the actuator 302, slides against a resistive member, such as a resistive strip 316, causing changes in resistance between terminals 318b and 318c or 318a and 318c as the actuator 302 moves up or down.

More specifically, the illustrated embodiment of a sensor includes an actuator 302 which contacts foam or deflection material 110 in a vehicle seat 104. The actuator 302 contains an actuator shaft 306 that slides inside a potentiometer 322. The potentiometer 322 is a cylindrical unit 304 that contains a dust seal 320 at the opening where the actuator shaft 306 enters the unit 304. Inside the cylindrical unit 304, the actuator shaft 306 is attached to a shuttle 308. Underneath the shuttle 308 is a compression spring 310 that sits on the bottom of the cylindrical unit 304. Between the shuttle 308 and the spring 310 is a metal wiper 312 that extends up one side of the shuttle 308 to form a wiper arm 314. The wiper arm 314 is a brush. Inside and along the side of the cylindrical unit 304 is a resistive strip 316. The resistive strip 316 is a material with a resistance, such as carbon or cermet (ceramic-metal). In one embodiment, the resistive strip is linear, that is, the resistance change is proportional to the deflection caused by the application of weight to the seat 104. In another embodiment, the resistance of the resistive strip is non-linear, that is, the resistance changes with a non-linear relationship to the deflection. The resistive strip 316 is positioned such that the wiper arm 314 contacts the resistive strip 316 while the actuator 302 moves up and down. Strip connections 318a-c extend from opposite ends of the resistive strip 316 and the bottom of the compression spring 310 outside of the cylindrical unit 304 to the processor 106.

Various portions of the under area of the vehicle seat deflect downward in response to weight on the vehicle seat 104. In various embodiments, the deflection is not directly proportional or maintains a linear relationship to the weight introduced. The point of contact is any point that moves downward due to the weight of the person sitting in the vehicle seat 104. When a person sits in the vehicle seat 104, the force of the person's weight moves the actuator 302. The actuator 302 slides inside the cylindrical unit 304 causing the shuttle 308 to compress the spring 310. When the shuttle 308 and the spring 310 move downward, the wiper arm 314 moves along the resistive strip 316 causing a change in resistance between the wiper arm 314 and strip connections 318a&b. The strip connections 318 are electrical connections or wires that connect the sensor 202 to the processor 106. In one embodiment, the change in resistance is a direct function of the deflection of the wiper arm 314 for linear resistive strips 316. Those skilled in the art will recognize that the actuator 302 and the actuator shaft 306 can be one member or two members without departing from the spirit and scope of the present invention.

The potentiometer 322 does not always require a cylindrical unit 304. Further, those skilled in the art will recognize that the cylindrical unit 304 includes any shape or housing that allows contact between the wiper arm 314 and resistive strip 316 as the actuator 302 changes positioning and can be used without departing from the spirit and scope of the present invention. In the illustrated embodiment, the sensor 202 is spring biased upward and presses lightly against the foam or deflection material 110 in the vehicle seat 104. In the illustrated embodiment, a compression spring 310 is used under the shuttle 308 to allow the actuator 302 to return to a neutral position when force is removed. In other embodiments, the spring is located such that it forces the actuator 302 (and the connecting member 306 and the shuttle 308 because of their connection to the actuator 302) to return to a neutral position. In still another embodiment, the sensor 202 does not have a spring 310, but rather the actuator 302 is attached to the deflection material 110 such that the actuator 302 moves in concert with the deflection material 110. That is, the actuator 302 moves in both directions by virtue of its connection to the deflection material 110.

Figure 4:
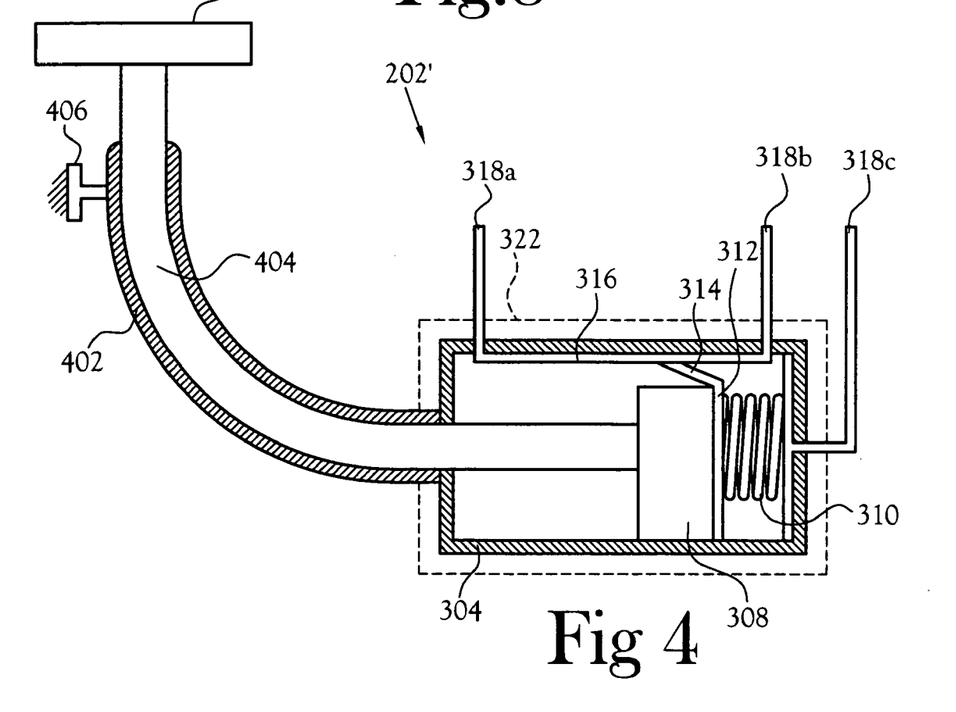
FIG. 4 is a cross-sectional view of another embodiment of a sensor.

FIG. 4 illustrates another embodiment of a sensor 202'. The actuator 302 is attached to a flexible shaft 404 that slides inside a tube 402. The flexible shaft 404 slides within the tube 402 and extends into the potentiometer 322. In one embodiment, the top of the tube 402 is secured relative to the occupant sensing apparatus frame 204 such as with a clamp 406. Those skilled in the art will recognize that the tube 402 is secured using any stabilizing mechanism that secures the tube while the flexible shaft 404 slides along the tube 402. When a force is applied to the top of the actuator 302, the flexible shaft 404 slides inside the tube 402 and the cylindrical unit 304 of the potentiometer 322 causing the shuttle 308 to compress the spring 310. When the shuttle 308 and the spring 310 move, the wiper arm 314 moves along the resistive strip 316 causing a change in resistance between the wiper arm 314 and strip connections 318a&b.

The tube 402 is hollow and functions as a passage for the flexible shaft 404. Those in the art will recognize that the tube is any material able to hold the flexible shaft without departing from the spirit and the scope of the invention. In one embodiment, the tube 402 encompasses the entire flexible shaft 404. In another embodiment, the tube 402 encompasses only a portion of the flexible shaft 404. In another embodiment, the tube 402 is a flexible or articulating tube, which allows additional flexibility in locating the potentiometer 322.

In the illustrated embodiment, the orientation of the actuator shaft 404 is varied to suit instances where there is a limited amount of room under the vehicle seat 104. Compared to the embodiment illustrated in FIG. 3, the space savings from the embodiment illustrated in FIG. 4 involves the approximate sum of the compressed height of the spring 310, the thickness of the shuttle 308, and the thickness of the end of the cylindrical unit 304.

For example, if the under area of a vehicle seat 104 is approximately four inches, the vertical positioning of the sensor as shown in FIG. 3 without the flexible shaft 404 may be too tall to easily fit under the seat. For example, if the cylindrical unit 304 is 3 inches tall and the actuator shaft 306 sits 2 inches above the potentiometer 322 when no force is applied, there would not be enough room underneath the vehicle seat 104 for the sensor assembly 102. However, if the cylindrical unit has a width of approximately one inch, the embodiment illustrated in FIG. 4 allows plenty of space for the sensor assembly 102 underneath the vehicle seat 104 with the potentiometer 322 mounted sideways. The sensor 202 with the flexible shaft 404 would require less than three inches under the seat as opposed to five inches required by the sensor 202 with the vertical actuator shaft 306.

Figure 5:
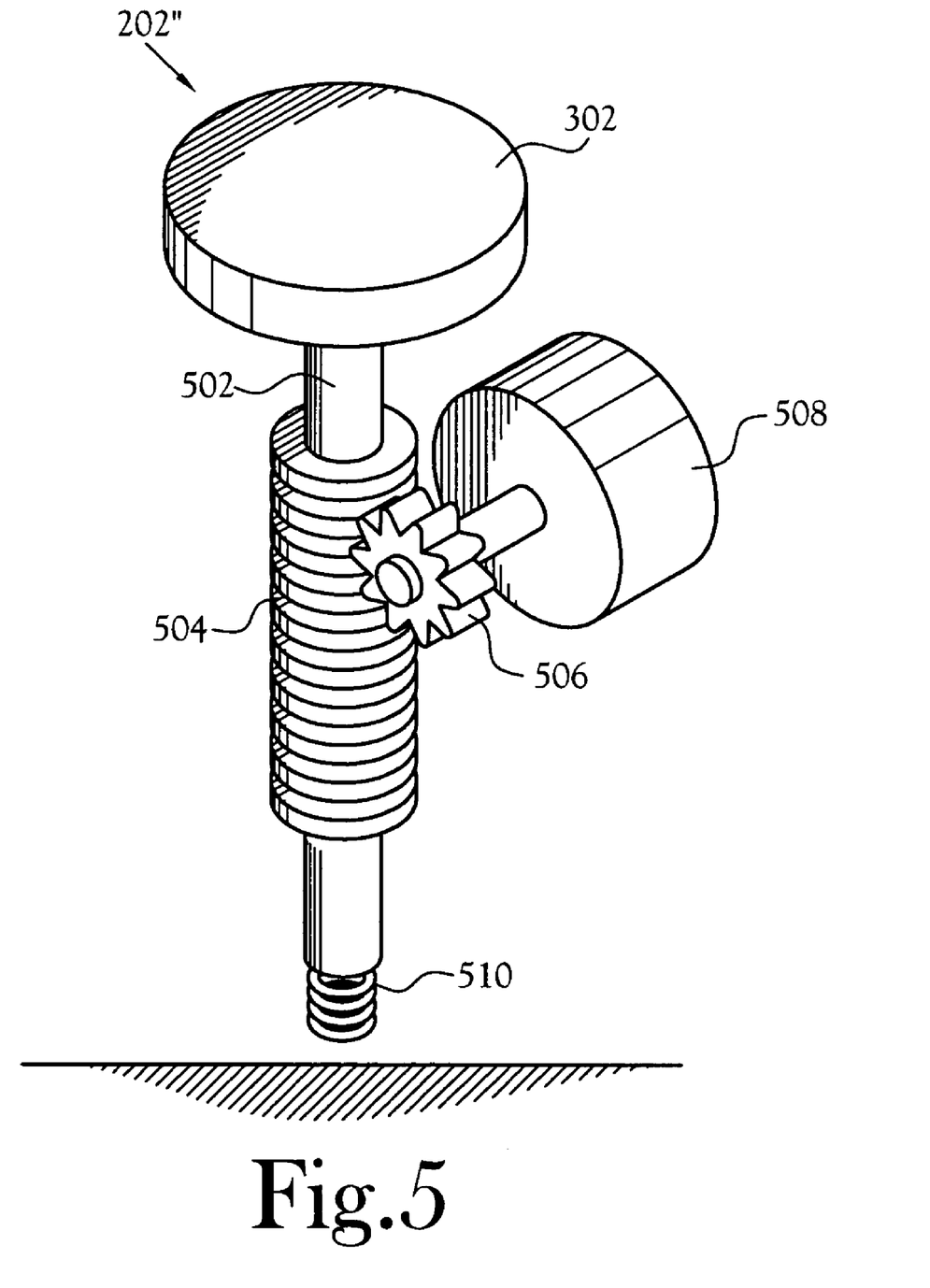
FIG. 5 is a perspective view of still another embodiment of a sensor.

FIG. 5 illustrates still another embodiment of a sensor 202". The actuator 302 has an actuator shaft 502 with teeth 504 along the side. The teeth 504 accommodate gears 506 that are attached to a rotary potentiometer 508. At the bottom of the actuator shaft 502 is a compression spring 510. When a force is applied to the top of the actuator 302, the actuator shaft 502 and teeth 504 move downward causing the gears 506 on the potentiometer 508 to rotate and thereby, create a change in resistance in the potentiometer 508.

In the illustrated embodiment, the teeth 504 on the actuator shaft 502 encompass the entire shaft. In another embodiment, the teeth do not entirely encompass the actuator shaft 502 but only cover a portion of the actuator shaft 502. In still another embodiment, the teeth 504 are carved into or are within the actuator shaft 502.

In another embodiment, the actuator shaft 502 rotates the shaft of the rotary potentiometer 508 by frictionally causing a wheel (not illustrated) attached to the potentiometer shaft to rotate as the actuator shaft 502 moves linearly. In still another embodiment, the actuator 302 is attached to the deflection material 110 and moves as the deflection material 110 moves. In this embodiment, there is no spring 510 because the actuator 302 and actuator shaft 502 move in concert with the deflection material 110.

Figure 6:
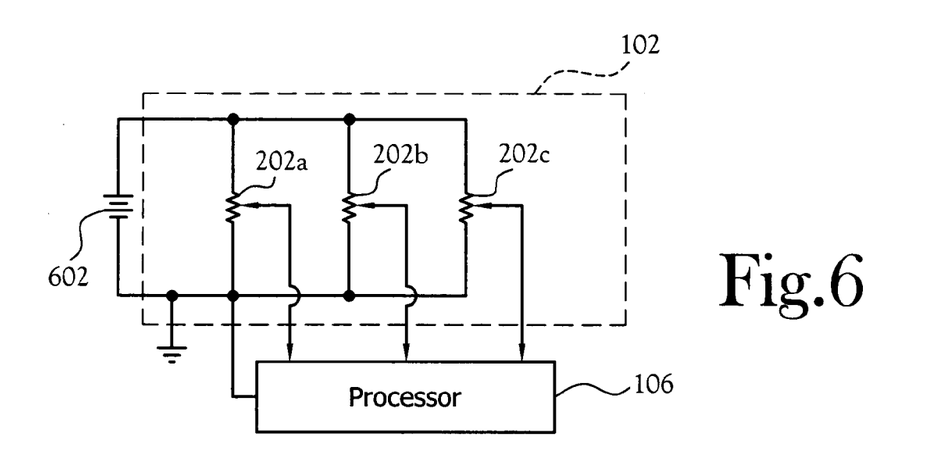
FIG. 6 is a schematic diagram of one embodiment of an occupant sensing apparatus connected to a processor.

FIG. 6 illustrates one embodiment of a schematic diagram of the sensor assembly 102 connected to the processor 106. The illustrated embodiment shows three sensors 202a, 202b, 202c. A voltage source 602 is connected to the sensors 202 and to the processor 106. Each sensor 202 is also directly connected to the processor 106.

The outputs from the various sensors 202 to the processor 106 establish the seating position of the person. In the illustrated embodiment, three sensors 202a, 202b, and 202c are positioned in three different zones, for example X, Y, and Z, respectively, underneath the vehicle seat. Each of these sensors 202a, 202b, and 202c are directly connected to the processor 106. The zones are regions or divided portions of the vehicle seat 104 where occupants generally sit or lean. For example, sensor 202a is located in zone X which corresponds to the back sitting portion of the vehicle seat 104 and sensor 202b is located in zone Y which corresponds to the middle portion of the vehicle seat 104. If an occupant sits in zone X, all sensors 202a, 202b, and 202c will measure some or no deflection and the processor 106 will determine the sitting position based on the amount of deflection measured by each sensor 202a, 202b, and 202c. In this case, the processor 106 will recognize that an occupant is positioned in the back sitting portion of the vehicle seat 104. If a deflection also occurs in sensor 202b, the processor will recognize that an occupant is positioned in both zone X, the back sitting portion, and zone Y, the middle portion, of the vehicle seat. Each sensor 202a, 202b, and 202c also have an electrical voltage output V1, V2, and V3, respectively. When a person sits on the vehicle seat, each sensor 202a, 202b, and 202c will have an amount of deflection corresponding to the amount of force provided by the person in each respective zone X, Y, or Z. For example, sensor 202a deflects two inches while sensor 202b only deflects one inch and sensor 202c does not deflect at all. This means that the person is putting more weight in zone X than in zone Y and little to no weight in zone Z. Based on the amount of deflection in each zone, each sensor will in turn produce a voltage output V1, V2, and V3 to the processor 106. The processor 106 then determines the seating position of the person based on the amount of deflection for each sensor 202a, 202b, and 202c. In one embodiment, weight is determined by the processor using a lookup table based on the amount of deflection measured in each zone. In another embodiment, weight is determined by an algorithm executed by the processor.

To protect persons sitting to close to the air bag system 108, one embodiment enables the processor 106 to disable the air bag system 108 if the deflection in the zone closest to the air bag system 108 or on the front of the vehicle seat 104 exceeds a certain amount.

The outputs from the various sensors 202 to the processor 106 also establish the weight or presence of the person. In one embodiment, once the seating position of the person is identified, the deflection from each of the sensors 202a, 202b, and 202c is further used to determine the weight of the person. Since the seat 104 is divided into zones, the processor 106 identifies the zones that the person is sitting in using the position values. The processor then determines weight based for those particular zones. Weight, like the seating position, is determined by using the amount of deflection from each sensor 202a, 202b, and 202c. The weight is calculated in the processor 106 based on the voltages V1, V2, and V3. These voltages are from the deflection change of each of the sensors 202a, 202b, and 202c, respectively. In one embodiment, the processor 106 adds the voltages V1, V2, V3 based on the deflection from each sensor 202a, 202b, and 202c or zone. If the total voltage V1+V2+V3 is above or below a threshold amount, the processor 106 disables the air bag system 108. In another embodiment, if V1+V2+V3 is within a certain amount, the processor 106 will disable the air bag system 108. In yet another embodiment, the weight is determined not by adding the voltages, but by the processor 106 executing an algorithm, or function, or look up table in which the deflection in the zones or of the sensors 202 determines the weight. In one embodiment, there are as many zones as there are sensors 202 and each sensor 202 has its own zone. In another embodiment, there are multiple sensors 202 in each zone.

In one embodiment, each of the functions are performed by one or more software routines run by the processor 106. In another embodiment, one or more of the functions identified are performed by hardware and the remainder of the functions are performed by one or more software routines run by the processor 106. In still another embodiment, the functions are implemented with hardware, with the processor 106 providing routing and control of the entire integrated system.

The processor 106 executes software, or routines, for performing various functions. These routines can be discrete units of code or interrelated among themselves. Those skilled in the art will recognize that the various functions can be implemented as individual routines, or code snippets, or in various groupings without departing from the spirit and scope of the present invention. As used herein, software and routines are synonymous. However, in general, a routine refers to code that performs a specified function, whereas software is a more general term that may include more than one routine or perform more than one function.

Figure 7:
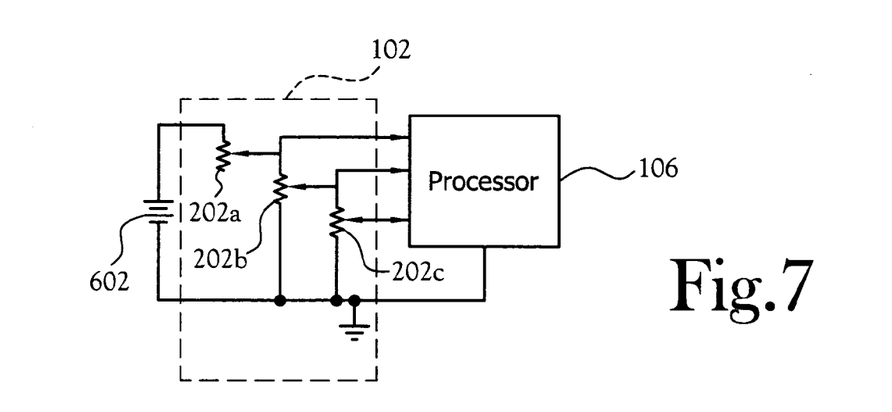
FIG. 7 is a schematic diagram of another embodiment of an occupant sensing apparatus connected to a processor.

FIG. 7 illustrates another embodiment of a schematic diagram of the sensor assembly 102 connected to the processor 106. A voltage source 602 is connected to the sensors 202a, 202b, and 202c and to the processor 106. Each of the sensors 202a, 202b, and 202c are connected directly to the processor 106. In the illustrated embodiment, sensors 202b&c provide voltage outputs that are dependent upon the position of sensor 202a.

Figure 8:
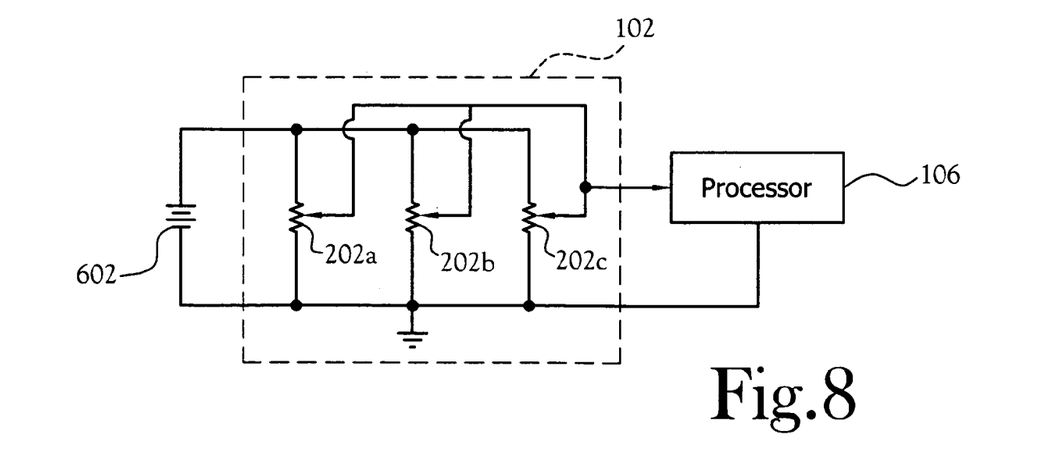
FIG. 8 is a schematic diagram of still another embodiment of an occupant sensing apparatus connected to a processor.

FIG. 8 illustrates yet another embodiment of a schematic diagram of the sensor assembly 102 connected to the processor 106. A voltage source 602 is connected to the sensors 202a, 202b, and 202c and to the processor 106. The wipers 312 of each sensor 202a, 202b, and 202c are connected to each other and then connected to the processor 106.

Figure 9:
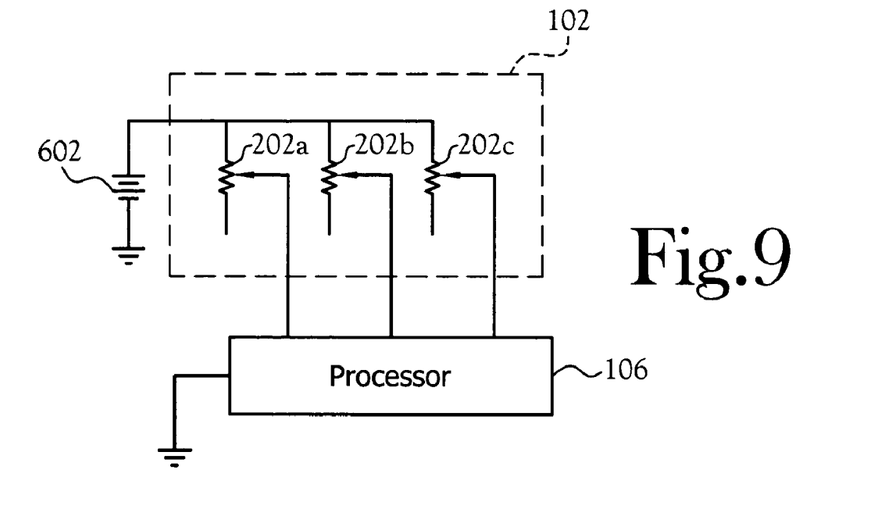
FIG. 9 is a schematic diagram of yet another embodiment of an occupant sensing apparatus connected to a processor.

FIG. 9 illustrates still yet another embodiment of a schematic diagram of the sensor assembly 102 connected to the processor 106. One side of a voltage source 602 is connected to the sensors 202a, 202b, and 202c. The wipers 312 of each sensor 202a, 202b, and 202c are connected directly to the processor 106.

FIGS. 6 through 9 are examples of four embodiments of connections of the sensor assembly 102 to the processor 106. Those skilled in the will recognize that variations of FIGS. 6 through 9 can be used without departing from the scope and spirit of the present invention. Further, in FIGS. 6 through 9, only three sensors 202 are shown. In other embodiments, the number of sensors 202 varies. Further, those skilled in the art will recognize that the resistance of the sensors 202 may be different and may have linear or nonlinear outputs without departing from the spirit and scope of the present invention.

Figure 10:
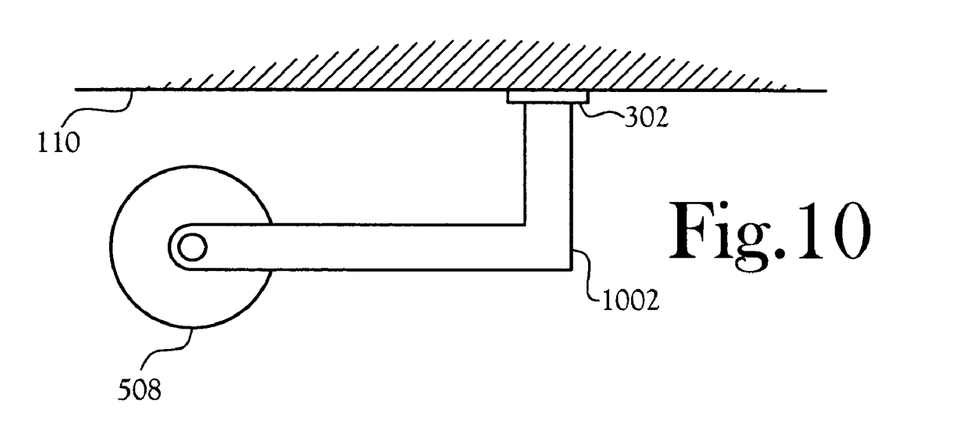
FIG. 10 is a side view of another embodiment of a rotary sensor.

FIG. 10 is a side view of another embodiment of a rotary potentiometer 508 operated by deflection of the deflection material 110. An actuator arm 1002 attached to the shaft of the rotary potentiometer 508 moves in concert with the actuator 302, which is attached to the deflection material 110. As the deflection material 110 deflects, the actuator 302 moves, causing the rotary potentiometer 508 to change resistance. In the illustrated embodiment, the actuator 302 is attached, either mechanically or chemically, to the surface of the foam or deflection material 110. In another embodiment, the actuator 302 is lightly biased against the deflection material 110 by a spring. Although the illustrated embodiment shows the deflection material 110 being that of the sitting portion of the seat 104, those skilled in the art will recognize that the deflection material 110' of the seat back or the head rest can also be used with this embodiment of the sensor 202.

Figure 11:
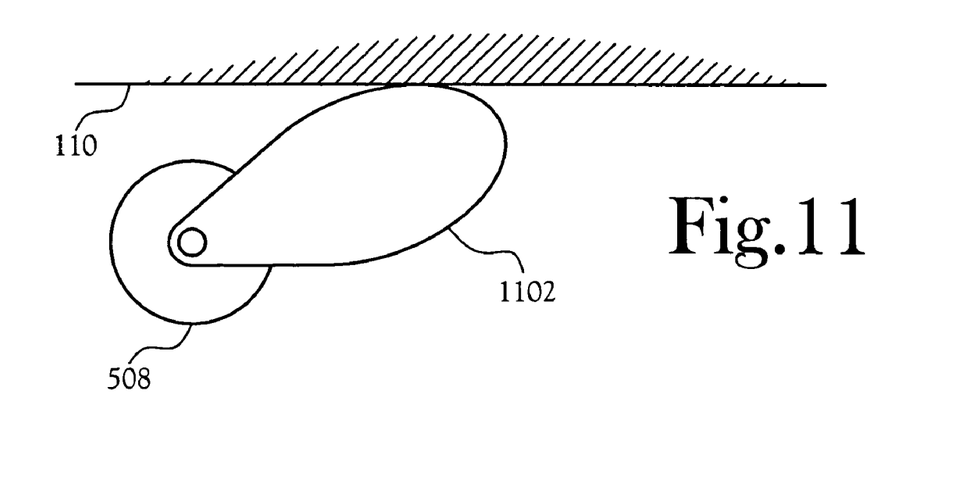
FIG. 11 is a side view of still another embodiment of a rotary sensor.

FIG. 11 is a side view of still another embodiment of a rotary potentiometer 508 operated by deflection of the deflection material 110. An actuator cam 1102 is lightly biased against the deflection material 110 such that as the deflection material 110 moves, the cam 1102 is moved about the shaft of the rotary potentiometer 508. Although the illustrated embodiment shows the deflection material 110 being that of the sitting portion of the seat 104, those skilled in the art will recognize that the deflection material 110' of the seat back or the head rest can also be used with this embodiment of the sensor 202.

The apparatus 10 for sensing occupants in a vehicle includes various functions. The function of sensing deflection of a seat surface is implemented by the various embodiments of the sensors 202, 202', 202" depicted in FIGS. 3, 4, 5, 10, and 11. The function of varying a resistance based on the deflection is implemented by the potentiometer 322, 508. The function of controlling an air bag system 108 based on the resistance is implemented, in various embodiments, by the processor 106 executing a process for determining the presence, weight, and/or position of an occupant in a vehicle seat 104 in response to the positions of the sensors 202 in each zone 212-222 to 216-226. In one embodiment, the weight is determined by a look up table. In another embodiment, the weight is determined by an algorithm calculating the weight based on the deflection in each zone 212-222 to 216-226.

From the foregoing description, it will be recognized by those skilled in the art that an apparatus to sense seated occupants for a vehicle occupant restraint system has been provided. The apparatus uses sensors which transfer linear or rotational movement to determine the presence, weight, and seating position of a person in a vehicle seat.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

The invention claimed is:

1. An apparatus for sensing an occupant in a vehicle, said apparatus comprising:
    a seat defining a first zone;
    a first sensor, said first sensor including:
        a first member, said first member being pushed downward by said seat in response to a deflection of said seat in said first zone;
        a connecting member attached to said first member, said connecting member being pushed downward by said first member in response to said first member being pushed downward by said seat;
        a potentiometer including:
            a shuttle attached to said connecting member, said shuttle being pushed by said connecting member in response to said connecting member being pushed downward by said first member,
            a wiper attached to said shuttle,
            a resistive member in electrical contact with said wiper, said shuttle moving relative to said resistive member in response to a deflection of said seat in said first zone,
            a first terminal being in electrical communication with said wiper, and
            at least one second terminal being in electrical communication with said resistive member, a resistance between said first terminal and said at least one second terminal varying with said deflection;
    a processor in electrical communication with said first sensor, said processor programmed to execute a process for determining at least one of a weight and a presence of the occupant; and
    a vehicle occupant restraint system in communication with said processor, said vehicle occupant restraint system controlled by said processor.

2. The apparatus of claim 1 wherein said potentiometer further includes a spring forcing said shuttle to a neutral position.

3. The apparatus of claim 1 wherein one of said first member and a potentiometer body is attached to said seat.

4. The apparatus of claim 1 wherein one of said first member and a potentiometer body is in contact with a surface selected from the group consisting of a sitting portion of said seat, a back support of said seat, and a headrest of said seat.

5. The apparatus of claim 1 wherein a linear movement of said first member is transferred to a linear movement of said shuttle.

6. The apparatus of claim 1 wherein said connecting member is a flexible shaft housed in a sheath whereby a linear movement of said first member is transferred to a linear movement of said shuttle.

7. The apparatus of claim 1 wherein said vehicle occupant restraint system includes an air bag system.

8. The apparatus of claim 1 further including a second sensor associated with a second zone defined on said seat.

9. The apparatus of claim 1 further including a second sensor associated with a second zone defined on said seat, said processor programmed to execute a process for determining a seated location of the occupant.

10. An apparatus for sensing an occupant in a vehicle, said apparatus comprising:
    a seat defining a plurality of zones;
    a plurality of first sensors, each said first sensor including:
        a first member, said first member being pushed downward by said seat in response to a deflection of said seat in a corresponding one of said plurality of zones;
        a connecting member attached to said first member, said connecting member being pushed downward by said first member in response to said first member being pushed downward by said seat;

a potentiometer including:
  a shuttle attached to said connecting member, said shuttle being pushed by said connecting member in response to said connecting member being pushed downward by said first member;
  a wiper attached to said shuttle;
  a resistive member in electrical contact with said wiper, said shuttle moving relative to said resistive member in response to a deflection of said seat in a corresponding one of said plurality of zones;
  a first terminal from said wiper; and
  at least one second terminal from said resistive member, a resistance between said first terminal and said at least one second terminal varying with said deflection;
a processor in electrical communication with said plurality of first sensors, said processor programmed to execute a process for determining at least one of a weight, presence, and a seated location of the occupant; and
a vehicle occupant restraint system in communication with said processor, said vehicle occupant restraint system controlled by said processor.

11. The apparatus of claim 10 wherein said potentiometer further includes a spring forcing said shuttle to a neutral position.

12. The apparatus of claim 10 wherein one of said first member and a potentiometer body is attached to said seat.

13. The apparatus of claim 10 wherein one of said first member and a potentiometer body is in contact with a surface selected from the group consisting of a sitting portion of said seat, a back support of said seat, and a headrest of said seat.

14. The apparatus of claim 10 wherein a linear movement of said first member is transferred to a linear movement of said shuttle.

15. The apparatus of claim 10 wherein said connecting member is a flexible shaft housed in a sheath whereby a linear movement of said first member is transferred to a linear movement of said shuttle.

16. The apparatus of claim 10 wherein said vehicle occupant restraint system includes an air bag system.

17. An apparatus for sensing an occupant in a vehicle, said apparatus comprising:
  a seat having a plurality of zones defined on a sitting portion;
  a plurality of sensors, each of said plurality of sensors actuated by a corresponding one of a plurality of first members, each of said plurality of first members being pushed downward in response to a deflection of said sitting portion in a corresponding one of said plurality of zones, each of said plurality of sensors including a corresponding one of a plurality of potentiometers;
  a plurality of connecting members, each one of said plurality of connecting members attached to a corresponding one of said plurality of first members such that one of said plurality of connecting members is pushed downward by a corresponding one of said plurality of first members in response to one of said plurality of first members being pushed downward by said sitting portion,
  a shuttle in a corresponding one of said plurality of potentiometers, said shuttle being pushed by one of said plurality of connecting members in response to one of said plurality of connecting members being pushed downward by a corresponding one of said plurality of first members, said shuttle moving a wiper along a resistive member, causing a corresponding one of said plurality of potentiometers to have a resistance value;
  a processor in electrical communication with said plurality of sensors, said wiper having a terminal in electrical communication with said processor, said processor programmed to execute a process for determining the presence of the occupant in said seat; and
  an occupant restraint system in communication with said processor, said occupant restraint system controlled by said processor.

18. The apparatus of claim 17 wherein said processor is programmed to execute a process for determining at least one of a weight and a seated location of the occupant in said seat.

19. The apparatus of claim 17 wherein said processor is programmed to execute a process for determining a weight whereby said process includes at least one of using a lookup table and calculating said weight from said plurality of sensors.

20. The apparatus of claim 17 wherein said plurality of zones includes at least two zones providing front to back sitting location of the occupant on said seat.

21. The apparatus of claim 17 wherein said plurality of zones includes at least two zones providing left to right sitting location of the occupant on said seat.

22. An apparatus for sensing an occupant in a vehicle, said apparatus comprising:
  a seat having a sitting portion;
  a plurality of sensors, each one of said plurality of sensors including:
    a first member, said first member being pushed downward by said sitting portion in response to a deflection of said sitting portion,
    a first connecting member attached to said first member, said first connecting member being pushed downward by said first member in response to said first member being pushed downward by said sitting portion,
    a potentiometer actuated by said first connecting member, said potentiometer including a shuttle attached to said first connecting member, said shuttle being pushed by said first connecting member in response to said connecting member being pushed downward by said first member, said shuttle moving a wiper along a resistive member;
  a processor in electrical communication with said plurality of sensors, said wiper having a terminal in electrical communication with said processor, said processor programmed to execute a process for determining the presence of the occupant in said seat; and
  an occupant restraint system in communication with said processor, said occupant restraint system controlled by said processor.

23. The apparatus of claim 22 wherein said processor is programmed to execute a process for determining at least one of a weight and a seated location of the occupant in said seat.

24. A sensor for detecting an occupant seated in a vehicle, said sensor comprising:
  a first member;
  a connecting member engaging said first member, said connecting member being pushed downward by said first member in response to the occupant being seated in the vehicle;

a potentiometer including:
- a body, said first member moving linearly in relation to said body;
- a shuttle attached to said connecting member, said shuttle being pushed by said connecting member in response to said connecting member being pushed downward by said first member;
- a wiper attached to said shuttle;
- a resistive member in electrical contact with said wiper, said shuttle moving relative to said resistive member in response to the occupant being seated in the vehicle;
- a first terminal from said wiper; and
- at least one second terminal from said resistive member, a resistance between said first terminal and said at least one second terminal varying with the occupant being seated in the vehicle.

25. The sensor of claim 24 wherein said first member is in contact with a surface selected from the group consisting of a sitting portion of said seat, a back support of said seat, and a headrest of said seat.

26. The sensor of claim 24 wherein said potentiometer body is attached to a surface selected from the group consisting of a sitting portion of said seat, a back support of said seat, and a headrest of said seat.

27. The sensor of claim 24 wherein a linear movement of said first member is transferred to a linear movement of said shuttle.

28. The sensor of claim 24 wherein said connecting member is a flexible shaft housed in a sheath whereby a linear movement of said first member is transferred to a linear movement of said shuttle.

* * * * *